US012756561B2

(12) United States Patent
Pasquier et al.

(10) Patent No.: US 12,756,561 B2
(45) Date of Patent: Oct. 6, 2026

(54) METHOD FOR SECURING AUTHENTICATION OF A DEVICE BY A MICROCONTROLLER

(71) Applicant: SCHAEFFLER TECHNOLOGIES AG & CO. KG, Herzogenaurach (DE)

(72) Inventors: Jérémy Pasquier, Rieux (FR); Bertrand Danet, Toulouse (FR); Jean-Christophe Seguy, Grenade (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/305,164

(22) Filed: Aug. 20, 2025

(65) Prior Publication Data

US 2026/0089000 A1 Mar. 26, 2026

(30) Foreign Application Priority Data

Sep. 24, 2024 (FR) ...................................... 2410149

(51) Int. Cl.
*H04L 9/32* (2006.01)

(52) U.S. Cl.
CPC ............ *H04L 9/32* (2013.01); *H04L 2209/84* (2013.01)

(58) Field of Classification Search
CPC ....... H04L 9/32; H04L 9/0869; H04L 9/3271; H04L 9/0866; H04L 2209/84; G06F 21/72; G06F 21/86; G06F 21/445; G06F 21/44; G06F 7/588; B60R 25/00; H01L 23/00
See application file for complete search history.

(56) References Cited

U.S. PATENT DOCUMENTS 8,015,224 B1 9/2011 Chaichanavong et al.
9,383,969 B2 7/2016 Van Der Sluis et al.
(Continued)

FOREIGN PATENT DOCUMENTS

CN 115309366 A 11/2022
WO 2023000304 A1 1/2023

OTHER PUBLICATIONS

Mouser (2014). Don't Leave Your Pins Floating; Retrieved May 15, 2026 from https://eu.mouser.com/blog/dont-leave-your-pins-floating (Year: 2014).*
(Continued)

*Primary Examiner* — Brian F Shaw
(74) *Attorney, Agent, or Firm* — Buchanan Ingersoll & Rooney PC

(57) ABSTRACT

The invention relates to a method for securing authentication of a device (2) by a microcontroller (11) comprising an electronic chip (111), comprising at least one pin (1111-A), called the "free" pin, not connected to any of the leads (112) of the microcontroller (11) and generating a noisy signal that is not accessible outside the microcontroller (11), said method comprising the steps of detection (E2) of a device (2), reception (E3), by a processing module (1112), of a noisy signal via the free pin (111-A), generation of a recognition signal from the received noisy signal, encryption (E4) of the recognition signal, transmission (E5) of the encrypted recognition signal to the device (2), decryption (E6) of the recognition signal, transmission (E7) of the decrypted recognition signal to the microcontroller (11), comparison (E8) of the generated recognition signal and of the decrypted recognition signal, and authentication (E9) of the device (2) when the decrypted recognition signal corresponds to the generated recognition signal.

12 Claims, 2 Drawing Sheets

(56) References Cited

U.S. PATENT DOCUMENTS

| | | | | |
|---|---|---|---|---|
| 9,998,280 | B2 | 6/2018 | Nix | |
| 2014/0016776 | A1 | 1/2014 | Van Foreest et al. | |
| 2019/0097793 | A1 | 3/2019 | Nix | |
| 2020/0327259 | A1* | 10/2020 | Aubineau | H04L 9/3271 |
| 2026/0052013 | A1* | 2/2026 | Villegas | H04L 9/0891 |

OTHER PUBLICATIONS

Sun (Machine Translation of CN 111882719) (Year: 2020).*
Barker et al., "Recommendation for Random Bit Generator (RBG) Constructions", NIST SP 800-90C 3pd, Sep. 2022. (101 pages).
Barker, et al., Recommendation for Random Number Generation Using Deterministic Random Bit Generators, NIST SP 800-90A Rev. 1, Jun. 2015. (110 pages).
French Search Report with machine translation mailed Apr. 1, 2025, by the French Patent Office for corresponding Application No. FR2410149. (18 pages).
O'Flynn, "BAM BAM! On Reliability of EMFI for in-situ Automotive ECU Attacks", Dalhousie University, Nov. 2020. (18 pages).
Rukhin et al., "A Statistical Test Suite for Random and Pseudorandom Number Generators for Cryptographic Applications", NIST SP 800-22 Rev. 1a, Apr. 2010. (131 pages).
Turan et al., "Recommendation for the Entropy Sources Used for Random Bit Generation", Computer security, NIST Special Publication 800-90B, Jan. 2018. (84 pages).

* cited by examiner

METHOD FOR SECURING AUTHENTICATION OF A DEVICE BY A MICROCONTROLLER

CROSS REFERENCE TO RELATED APPLICATIONS

This claims priority to French Patent Application No. FR2410149, filed Sep. 24, 2024, the contents of such application being incorporated by reference herein.

FIELD OF THE INVENTION

The present invention relates to the field of authentication and more particularly relates to a method for securing authentication.

BACKGROUND OF THE INVENTION

With the electrification of vehicles and the multiplication of the number of functions performed electronically, more and more equipment embedded in vehicles is controlled by electronic control units. Electronic control units in particular comprise an information-processing unit, more commonly called a "microcontroller", connected to an electronic circuit. The electronic control unit is often protected by a package.

Microcontrollers are produced by specialist industries and must therefore be pre-programmed to perform the functions desired by the manufacturer. These functions also sometimes need to be initialized following installation of the microcontroller in the vehicle. It may also be necessary to modify the programming of the microcontroller during its life cycle.

Thus, it is necessary to be able to communicate with the microcontroller via a suitable device after its manufacture. However, this ability to communicate may, for malicious purposes, be used to access, recover or modify parts of the program integrated into the microcontroller of the electronic chip or indeed to modify it, this representing a risk to the security and integrity of the vehicle. The maintenance services of the microcontroller are also liable to be targeted by such attacks.

It is therefore necessary to ensure the security of exchanges between microcontrollers and the devices used for their maintenance.

This security is achieved through an authentication request based on cryptographic principles. The principle is for the microcontroller to possess a public key that allows encryption and for the device to possess a private key that allows decryption. The microcontroller generates a recognition signal, which is encrypted with the key and transmitted to the device. The device decrypts it with its key and transmits this decrypted recognition signal back to the microcontroller. The microcontroller may then compare the recognition signal that it generated with the decrypted recognition signal, and if both match, the device is authenticated and is allowed access to the microcontroller.

However, it is necessary for the recognition signal to be generated randomly on each authentication, because otherwise interception of the decrypted response could allow a third party to access the microcontroller fraudulently (interception beforehand of a decrypted recognition signal issued by a legitimate device).

It is therefore essential to generate a random signal. The problem to be addressed is that, although the signal is ideally random, currently it is not completely random as it is based on a pre-existing signal that is used to generate a sufficiently large number.

If a third party is able to pick up the pre-existing signal or indeed to discover part of the processing operation used to generate the number, the third party may, provided she or he has access to a great deal of computing power, transmit a large number of messages to the microcontroller in a short time until the signal required for authentication is transmitted. She or he may also take advantage of a weakness in the microcontroller to gain authentication.

One solution could be to generate the random number using a physical signal collected by the microcontroller, such as a temperature or an electric field. However, if the third party also has access to these physical signals, she or he would be able to conduct the attack in the same way.

Therefore, there is a need for a simple and effective solution allowing at least some of these drawbacks to be overcome.

SUMMARY OF THE INVENTION

To this end, a first subject of the invention is a method for securing authentication of a device by a microcontroller, said microcontroller comprising:

- a package,
- a plurality of leads, extending from inside to outside the package,
- and an electronic chip, placed inside said package, said electronic chip comprising:
- a plurality of pins, some of the pins being electrically connected to the leads of the microcontroller, and at least one pin, called the "free" pin, to a lead and behaving as a passive antenna inside the package, generating a noisy signal that is not accessible outside the package,
- a processing module, configured to generate a recognition signal from a noisy signal generated by said at least one free pin,
- an encryption module connected to the processing module, and configured to encrypt the recognition signal using an encryption key recorded in a memory region of the electronic chip, and
- a communication module, connected to the encryption module, and configured to communicate with the device,
- said device being configured to communicate with the communication module of the electronic chip, and decrypt a signal received by the communication module using a decryption key corresponding to the encryption key of the encryption module of the electronic chip, said method comprising the steps of:
- detection, by the microcontroller, of the presence of the device,
- reception, by the processing module, of a noisy signal not accessible outside the package via the at least one free pin,
- generation, by the processing module, of a recognition signal based on an operation of processing the received noisy signal,
- encryption, by the encryption module, of the recognition signal using the encryption key,
- transmission, by the communication module of the electronic chip, of the encrypted recognition signal to the device,
- reception, by the device, of the recognition signal, decryption by the device, using the decryption key, of the recognition signal, transmission, by the device, of the decrypted recognition signal to the microcontroller, comparison, by the electronic chip, of the generated recognition signal and of the decrypted recognition signal, and authentication, by the microcontroller, of the device when the decrypted recognition signal corresponds to the generated recognition signal.

By free pin, what is meant is a pin of the electronic chip that is not electrically connected to one of the leads of the microcontroller.

By encryption key, what is meant is a sequence of mathematical operations that allow the recognition signal to be modified, in particular when the latter takes the form of a sequence of digits, in order to encrypt and protect it.

The method according to an aspect of the invention allows the random nature of the recognition signal to be ensured by generating it from noisy signals issuing from the at least one free pin. The at least one free pin, by behaving as a passive antenna, generates a very noisy signal that depends greatly on fluctuations in physical parameters inside the microcontroller package. These fluctuations are highly variable and are not accessible from outside the package, since they depend on physical parameters inside the package, which is sealed. The highly variable nature of these fluctuations and their inaccessibility make them robust sources usable to generate the most random possible recognition signals for protecting the microcontroller.

The random nature of the recognition signal ensured by the method according to an aspect of the invention may also be used in other security applications, such as intrusion detection, detection of modifications of the execution context of a program in the microcontroller or security-key personalization. In addition, it is also known to use random numbers to generate symmetric secret keys, asymmetric private keys, initialization vectors (in the context of CBC mode encryption for example), nonces (i.e. numbers used once) or single-use data. They are also used in production of non-deterministic signatures and to ensure the uniqueness of secure messages exchanged by computers, and the generation of the random signal according to an aspect of the invention also makes it possible to generate signals for these applications in a more secure manner.

Preferably, the electronic chip comprises a plurality of free pins and the step of the method in which the noisy signal is received comprises reception of the noisy signals issuing from the plurality of free pins. The free pins, which for example are two in number, may generate signals that are very different from each other, and thus reinforce the random and not easily reproducible nature of the generated recognition signal and thus increase the robustness of the solution.

In one mode of operation of the method, the measurement of the noisy signal via the at least one free pin is realized continuously. This mode of operation allows rapidity to be increased since the processing module continuously measures the signals, while offering a solution with a very high or even continuous availability.

In an alternative mode of operation of the method, the measurement of the noisy signal via the at least one free pin is realized only following detection of the device. This mode of operation is more secure since the recognition signal generated by the processing module depends solely on the moment when the method is carried out and is also robust to an attack based on the timing of the generation of the signal.

Advantageously, the step of generation of the recognition signal is realized on a plurality of operations of processing received signals, preferably sixteen. The recognition signal is thus sufficiently long and different parts of it are derived from different signals, this greatly increases the security of the recognition signal in accordance with NIST standards.

According to another aspect, the invention relates to a computer program product characterized in that it comprises a set of program code instructions which, when they are executed by one or more processors, configure the one or more processors to implement the method as described above.

Another subject of the invention is a microcontroller comprising:

a package, a plurality of leads, extending from inside to outside the package, and an electronic chip, placed inside said package, said electronic chip comprising:

a plurality of pins, some of the pins being electrically connected to the leads of the microcontroller, at least one pin, called the "free" pin, not being connected to the leads of the microcontroller and behaving as a passive antenna inside the package, generating a noisy signal that is not accessible outside the package, a processing module, configured to generate a recognition signal from a noisy signal generated by said at least one free pin, an encryption module connected to the processing module, and configured to encrypt the recognition signal using an encryption key recorded in a memory region of the electronic chip, and a communication module, connected to the encryption module, and configured to communicate with the device, said microcontroller being configured to implement the method as described above.

Another subject of the invention is an electronic control unit comprising a microcontroller as described. Such an electronic control unit is thus better protected against piracy attempts by the method according to an aspect of the invention implemented by the microcontroller.

Another subject of the invention is a vehicle, in particular a motor vehicle, comprising at least one electronic control unit as described.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF EXEMPLARY EMBODIMENTS

Figure 1:
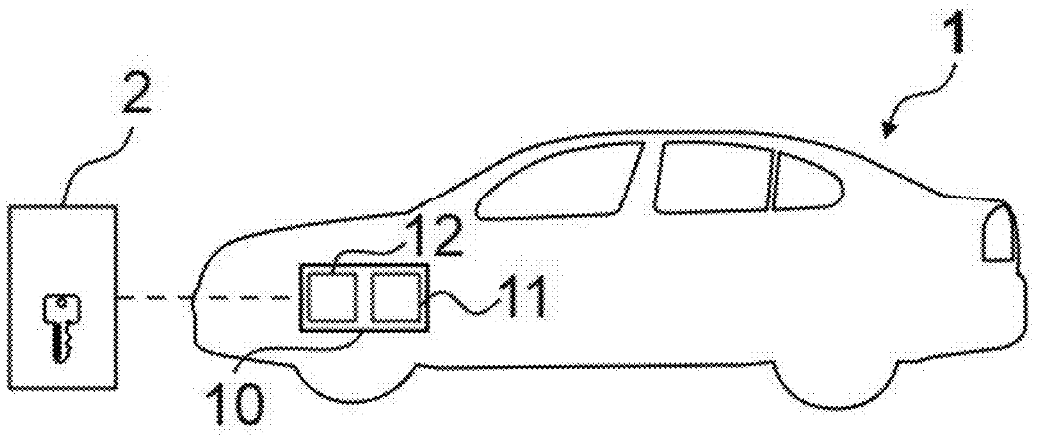
FIG. 1 schematically illustrates a vehicle comprising a microcontroller allowing the method for authenticating a device according to an aspect of the invention to be implemented.

As shown in FIG. 1, the method according to an aspect of the invention is implemented when a user seeks to authenticate a device 2 in order to gain access to the programming of a microcontroller 11 of an electronic control unit 10 of a vehicle 1.

Vehicle 1

The vehicle 1 comprises the electronic control unit 10, which allows one of the functions of the vehicle 1 to be controlled.

In the example shown in FIG. 1, the vehicle 1 is an automobile. This example is non-limiting and the vehicle 1 could be any type of vehicle, for example a motorized two-wheeler.

Electronic Control Unit 10

The electronic control unit 10 comprises a microcontroller 11 and a transceiver 12.

The electronic control unit 10 also comprises an electric circuit, which has not been shown in the figures for the sake of clarity. The circuit connects the microcontroller 11 and the transceiver 12.

The electronic control unit 10 is configured to take charge of the control of one of the functions of the vehicle 1, such as for example opening the doors and luggage compartment, measuring speed, etc.

The transceiver 12 is configured to communicate with the microcontroller 11 via the circuit and with the device 2 via a communication link, preferably a wireless communication link.

Microcontroller 11

Figure 2:
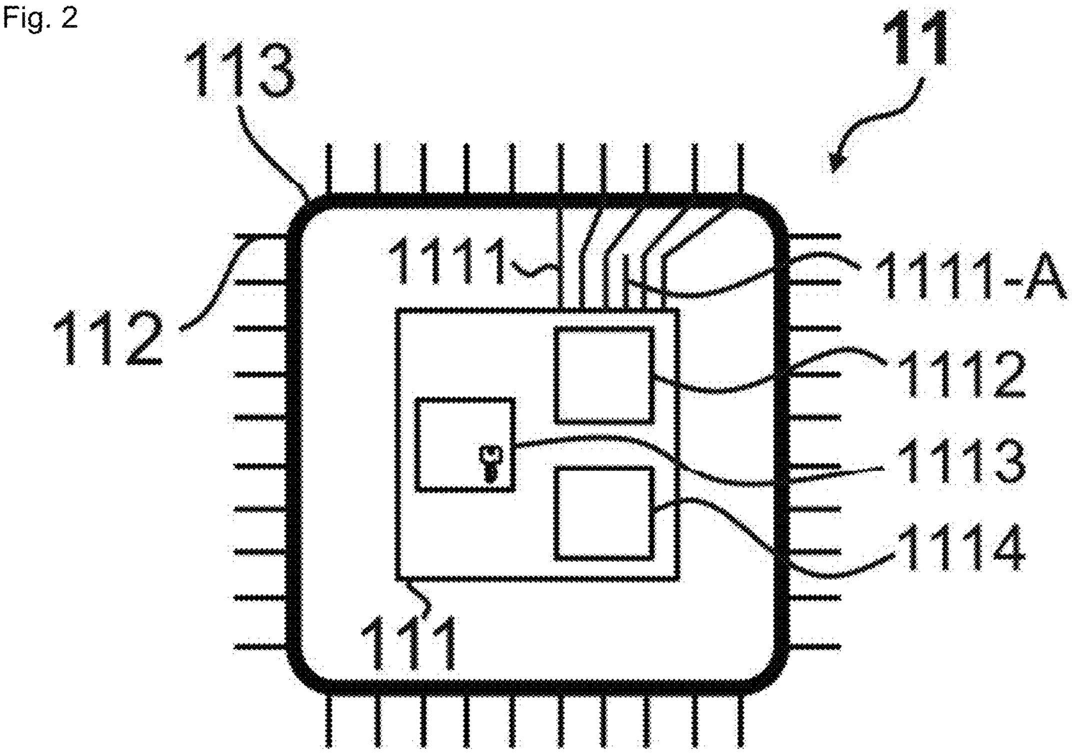
FIG. 2 schematically illustrates a microcontroller configured to implement the method according to an aspect of the invention.

As shown in FIG. 2, the microcontroller 11 comprises an electronic chip 111, a set of leads 112 and a package 113.

The electronic chip 111 is located inside the package 113, and the set of leads 112 are connected to the electronic chip 111 and extend from inside to outside the package 113.

The set of leads 112 is connected to the electric circuit of the electronic control unit 10, in particular to connect the microcontroller 11 to the transceiver 12.

The package 113 is preferably sealed, for example by being cast on the electronic chip 111 and the set of leads 112. The interior of the casing 113 of the microcontroller 11 is thus not accessible.

Electronic Chip 111

The electronic chip 111 comprises a set of pins 1111, a processing module 1112, an encryption module 1113, and a communication module 1114.

The electronic chip 111 comprises the programming of the microcontroller 11.

The electronic chip 111 is configured to permit or not permit the device 2 to access the programming of the microcontroller 11.

Each lead of the set of leads 112 is connected to a pin 1111 of the set of pins 1111, but certain pins, called "free" pins 1111-A, are not connected to a lead of the set of leads 112.

In FIG. 2, a single free pin 1111-A has been shown for the sake of clarity, but the electronic chip 111 may comprise a plurality thereof.

Each free pin 1111-A picks up variations in physical parameters (temperature, electric field, magnetic field, etc.) inside the package 113. Each free pin 1111-A thus behaves as a passive antenna and the signals issuing from these passive antennas are very noisy.

The processing module 1112 is configured to receive the noisy signals issuing from the free pin 1111-A and process them to produce a recognition signal.

Preferably, the recognition signal is a sequence of numbers.

Also preferably, the recognition signal is a sequence of numbers generated by a plurality of successive operations of processing the signals received by the processing module 1112, preferably sixteen successive processing operations.

The processing module 1112 may generate the recognition signal constantly or indeed generate it only following reception of a specific signal.

The processing module 1112 is configured to record the recognition signal in a memory region of the electronic chip 111.

In a manner known per se, the processing module may comprise an ADC circuit (ADC being the abbreviation of analogue-to-digital converter) for converting the received noisy signal into a digital signal, a filtering module for filtering a portion of the noisy signal and a random-number-generation module for generating the sequence of numbers based on the filtered digital signal.

The encryption module 1113 contains an encryption key and is configured to encrypt a recognition signal using said encryption key.

The communication module 1114 is configured to communicate with the transceiver 12 via the leads 112 of the microcontroller 11 and the circuit of the electronic control unit 10. More precisely, the communication module 1114 is configured to collect the recognition signal encrypted by the encryption module 1113 and to transmit said encrypted recognition signal to the device 2 via the transceiver 12.

The communication module 1114 is configured to record a recognition signal in a memory region of the electronic chip 111.

The electronic chip 111 is configured to compare the recognition signal recorded by the processing module 1112 and the recognition signal recorded by the communication module 1114.

Device 2

The device 2 is a device used by a user. It is configured to communicate with the communication module 1114 of the electronic control unit 10 via the transceiver 12.

The device 2 contains a decryption key corresponding to the encryption key of the encryption module 1113 and is configured to decrypt an encrypted recognition signal using this decryption key.

The device 2 is configured to transmit the decrypted recognition signal to the microcontroller 11 via the transceiver 12.

Example of Implementation

Each free pin 1111-A in the microcontroller 11 behaves as a passive antenna, i.e. it continuously picks up fluctuations in physical parameters inside the package 113. This passive-antenna behaviour causes each free pin 1111-A to issue very noisy signals.

Because of the very noisy nature of these fluctuations, two free pins 1111-A issue signals that are different from each other.

Figure 3:
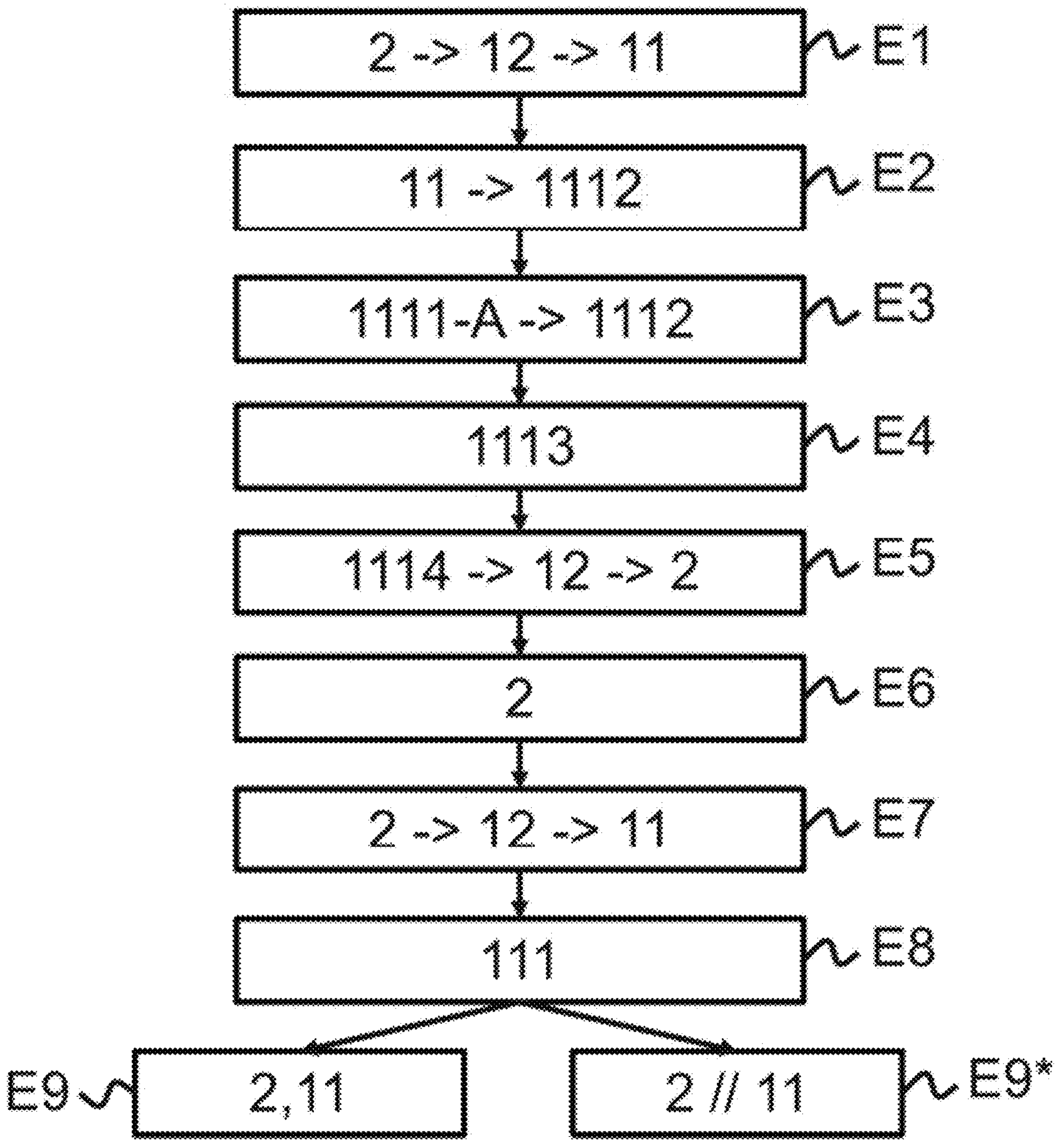
FIG. 3 schematically illustrates one embodiment of the method according to the invention.

When a user wishes to gain access to the programming of the microcontroller 11 of the vehicle 1 via a device 2, the method according to an aspect of the invention is implemented. See, FIG. 3.

In a first step E1, the device 2 transmits a detection signal to the microcontroller 11 via the transceiver 12 of the electronic control unit 10.

In this step, the device 2 for example generates a radio-frequency signal that is received by the transceiver 12, which then transmits this signal to the microcontroller 11 via the circuit of the electronic control unit 10.

In another form of embodiment, the device 2 is plugged into the electronic control unit 10 and the generated signal is transmitted to the transceiver 12 via the circuit.

In a second step E2, the microcontroller 11 receives the detection signal and the electronic chip 111 triggers generation of the recognition signal.

In a third step E3, the processing module 1112 receives a noisy signal from at least one free pin 1111-A and processes this noisy signal to generate a recognition signal taking the form of a sequence of numbers.

In another mode of operation, the processing module 1112 constantly receives noisy signals from the free pins 1111-A but generates the recognition signal only after receiving the detection signal.

In this step, the recognition signal is generated based on a plurality of sequences of numbers, each sequence being generated by different noisy signals coming from different free pins 1111-A.

Thus, the recognition signal, since it is generated based on noisy signals that are different from one another, may be considered to be random and is more secure with respect to attempts to reproduce the recognition signal for piracy purposes.

In a step E4, the recognition signal is encrypted by the encryption module 1113 using the encryption key. This step allows the recognition signal to be protected, because if a third party does not possess the encryption key, she or he cannot access the recognition signal.

However, if the third party succeeds in determining the recognition signal via other methods, she or he could use it to access the microcontroller 11. The random nature of the recognition signal, reinforced by the passive-antenna operation of the free pins 1111-A, is thus essential to thwarting this type of attack.

In a step E5, the encrypted recognition signal is transmitted by the communication module 1114 to the device 2 via the transceiver 12. The encryption of the recognition signal allows it to be protected if a third party intercepts this communication.

After having received the encrypted recognition signal, the device 2 decrypts it with the decryption key stored in memory in a step E6. Since this decryption key corresponds to the encryption key stored in the encryption module 1113, the device is able to reform the generated recognition signal.

In a step E7, the device 2 transmits the decrypted recognition signal to the microcontroller 11, via the transceiver 12.

In a step E8, the electronic chip 111 compares the recognition signal generated in step E3 and the decrypted recognition signal transmitted by the device 2.

If the two recognition signals correspond, the device 2 is authenticated in a step E9 and the user may gain access to the programming of the microcontroller 11 via the device 2.

If the two recognition signals do not correspond, the device 2 is not authenticated in a step E9* and the user does not gain access to the programming of the microcontroller 11 via the device 2, thus protecting the microcontroller 11 from piracy attempts.

The method according to an aspect of the invention thus makes it possible to generate a signal the random character of which is ensured by noise that is not accessible to the outside world and that does not require any modification with respect to the components currently used.

The invention claimed is:

1. A method for securing authentication of a device by a microcontroller, said microcontroller comprising:
- a package,
- a plurality of leads, extending from inside to outside the package, and an electronic chip, placed inside said package, said electronic chip comprising:
- a plurality of pins, some of the pins being electrically connected to the leads of the microcontroller, at least one pin, called the "free" pin, not being connected to a lead and behaving as a passive antenna inside the package, generating a noisy signal that is not accessible outside the package,
- a processing module, configured to generate a recognition signal from the noisy signal generated by said at least one free pin,
- an encryption module connected to the processing module, and configured to encrypt the recognition signal using an encryption key recorded in a memory region of the electronic chip, and
- a communication module, connected to the encryption module, and configured to communicate with the device, said device being configured to:
- communicate with the communication module of the electronic chip, and decrypt a signal received by the communication module using a decryption key corresponding to the encryption key of the encryption module of the electronic chip, said method comprising:
- detecting, by the microcontroller, of the presence of the device,
- receiving, by the processing module, of the noisy signal not accessible outside the package via the at least one free pin, and generation of the recognition signal based on an operation of processing the received noisy signal,
- encrypting, by the encryption module, of the recognition signal using the encryption key,
- transmitting, by the communication module, of the encrypted recognition signal to the device,
- receiving, by the device, of the encrypted recognition signal and decryption, using the decryption key,
- transmitting, by the device, of the decrypted recognition signal to the microcontroller,
- comparing, by the electronic chip, of the generated recognition signal and of the decrypted recognition signal, and
- authenticating, by the microcontroller, of the device when the decrypted recognition signal corresponds to the generated recognition signal.

2. The method according to claim 1, wherein the electronic chip comprises a plurality of free pins and the step of reception of the noisy signal is realized through reception of the noisy signal issuing from the plurality of free pins.

3. The method according to claim 1, wherein the receiving of the noisy signal via the at least one free pin to a lead is realized continuously.

4. The method according to claim 1, wherein the receiving of the noisy signal via the at least one free pin is realized only following the detecting of the device.

5. The method according to claim 1, wherein the generating of the recognition signal from the noisy signal is realized on a plurality of operations of processing the received signals.

6. A non-transitory computer program product, comprising a set of program code instructions which, when they are executed by one or more processors, configure the one or more processors to implement a method according to claim 1.

7. A microcontroller comprising:

a package, a plurality of leads, extending from inside to outside the package, and an electronic chip placed inside said package, said electronic chip comprising:

a plurality of pins, some of the pins being electrically connected to the leads of the microcontroller, and at least one pin, called the "free" pin, not connected to the leads of the microcontroller and behaving as a passive antenna inside the package, generating a noisy signal that is not accessible outside the package, a processing module, configured to generate a recognition signal from the noisy signal generated by said at least one free pin, an encryption module, connected to the processing module, and configured to encrypt the recognition signal using an encryption key recorded in a memory region of the electronic chip, and a communication module, connected to the encryption module, and configured to communicate with the device, said microcontroller being configured to implement the method according to claim 1.

8. An electronic control unit comprising a microcontroller according to claim 7.

9. A motor vehicle, comprising at least one electronic control unit according to claim 8.

10. The method according to claim 2, wherein the receiving of the noisy signal via the at least one free pin to a lead is realized continuously.

11. The method according to claim 2, wherein receiving of the noisy signal via the at least one free pin is realized only following detection of the device.

12. The method according to claim 1, wherein the generating of the recognition signal from the noisy signal is realized on sixteen operations of processing the received signals.

* * * * *